United States Patent
Menz et al.

(10) Patent No.: US 7,149,013 B2
(45) Date of Patent: Dec. 12, 2006

(54) OPTICAL ELEMENT AND METHOD FOR THE PRODUCTION THEREOF

(75) Inventors: Irina Menz, Diedorf (DE); Guenther Dausmann, Erding (DE)

(73) Assignee: Giesecke & Devrient GmbH (DE)

( * ) Notice: Subject to any disclaimer, the term of this patent is extended or adjusted under 35 U.S.C. 154(b) by 0 days.

(21) Appl. No.: 10/479,034

(22) PCT Filed: May 29, 2002

(86) PCT No.: PCT/EP02/05930

§ 371 (c)(1),
(2), (4) Date: May 17, 2004

(87) PCT Pub. No.: WO02/097537

PCT Pub. Date: Dec. 5, 2002

(65) Prior Publication Data

US 2004/0207892 A1  Oct. 21, 2004

(30) Foreign Application Priority Data

May 30, 2001 (DE) ............................... 101 26 342

(51) Int. Cl.
*G02H 1/00* (2006.01)
(52) U.S. Cl. .............................. 359/2; 359/22; 359/24; 359/572; 428/410
(58) Field of Classification Search .................. 359/1, 359/2, 3, 22, 24, 572, 576; 428/410
See application file for complete search history.

(56) References Cited

U.S. PATENT DOCUMENTS 5,483,363 A  1/1996  Holmes et al.
5,900,954 A  5/1999  Katz et al.
5,958,528 A *  9/1999  Bernecker ..................... 428/29
6,337,752 B1 *  1/2002  Heckenkamp et al. ......... 359/2
6,493,014 B1 *  12/2002  Aroneo ....................... 347/171

FOREIGN PATENT DOCUMENTS

DE     39 32 505 A    4/1991
WO    WO 97 04339 A   2/1997

* cited by examiner

*Primary Examiner*—Fayez G. Assaf
(74) *Attorney, Agent, or Firm*—Rothwell, Figg, Ernst & Manbeck PC

(57) ABSTRACT

A method for producing an optical element, preferably a security feature, wherein a film having a first embossed hologram in an embossing layer is provided, and a second embossed hologram is embossed into the same embossing layer such that the first embossed hologram is partly replaced with the second embossed hologram. The invention further relates to a method for producing an optical element wherein an embossable film provided with an embossed hologram is partly filled with printing lacquer, and a method for producing an optical element wherein hologram embossing is prevented by prior partial printing of the embossing film with curable printing lacquer. The invention relates further to optical features producible by the inventive methods, documents of value having an inventive optical feature and a numbering embosser for use in an inventive production method.

20 Claims, 2 Drawing Sheets

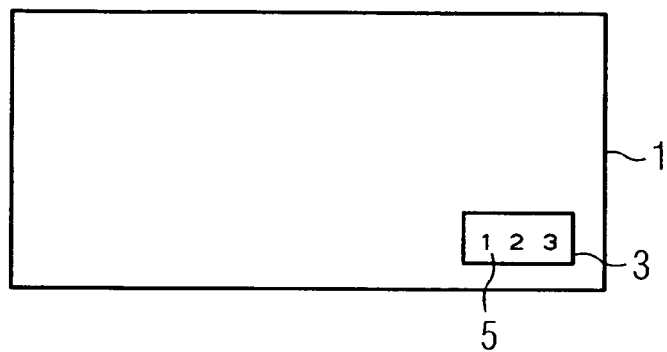
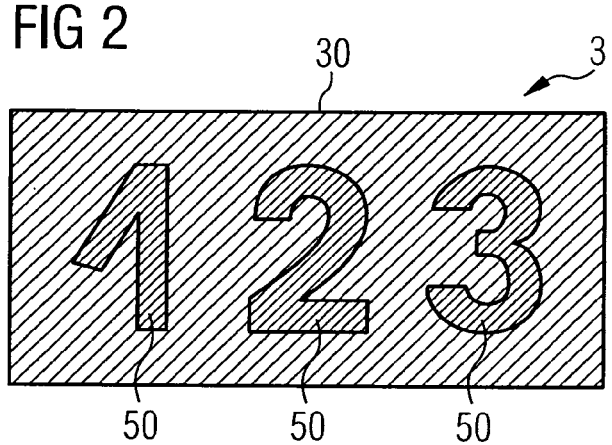
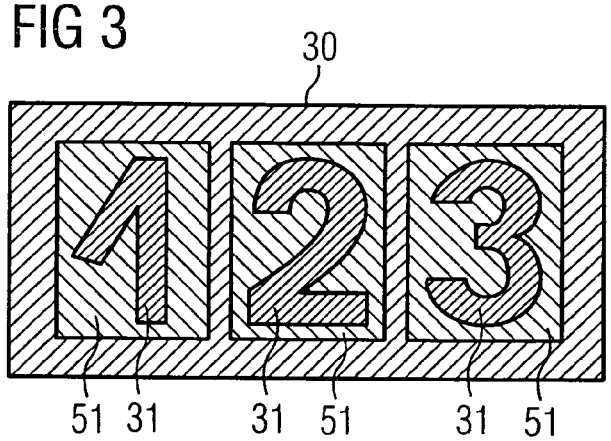

OPTICAL ELEMENT AND METHOD FOR THE PRODUCTION THEREOF

This application is a §371 of PCT Application Serial No. PCT/EP02/05930, filed May 29, 2002.

BACKGROUND OF THE INVENTION

1. Field of the Invention

This invention relates to methods for producing an optical element, optical elements producible by said methods, documents of value having such optical elements and a numbering embosser for use in an inventive method.

2. Description of the Background Art

Documents, certificates, bank notes, identity cards, plastic cards, etc., can be reproduced true-to-detail and colorfast using modern high-resolution color scanners and using color laser printers or thermal sublimation printers. The common availability of color copiers has also made it substantially easier to produce high-quality forgeries.

There is therefore a need to make documents, identity cards, bank notes, papers of value, plastic cards, etc., forgery-proof through additionally applied security features. Such security features can at least make it much more difficult and expensive to produce a high-quality forgery. Known security features are watermarks, silk threads, intertwined line structures, and the use of special paper. The application of metalized embossed holograms to bank notes, credit cards and Eurocheque cards has also become generally established. Due to the holographic effect, such embossed holograms can also be used for a special esthetic design of such documents or other objects.

Such embossed holograms are produced e.g. by embossing holographic image reliefs into an embossable film in bulk. An adhesive layer is applied to the embossed film. Further design is therefore no longer possible. With the adhesive layer the embossed film is applied e.g. as a security feature.

However, such simple embossed holograms likewise offer only limited protection from forgery. The increasing spread of corresponding technology already makes it possible to imitate such embossed holograms.

SUMMARY OF THE INVENTION

It would therefore be desirable if methods were available for producing optical elements whose forgery is further impeded and that permit simple individualization. It is the problem of the present invention to specify corresponding methods for producing optical elements, optical elements that are difficult to forge, documents of value having such optical elements and an embossing tool for use in a production method.

In a first inventive method, an embossable film or substrate surface having a first embossed hologram is first provided. Said embossed hologram can have been embossed into an embossable film as a holographic image relief in the known way. Thus, the first embossed hologram in the embossing layer of said film is mass-producible. In the inventive method a second embossed hologram is embossed into the same embossing layer where the first embossed hologram is already formed. According to the invention, the second embossed hologram partly replaces the first embossed hologram.

In the inventive method two embossed holograms are thus embossed into one another. The second embossed hologram can be selected so that it holographically reconstructs a different image from the first embossed hologram when illuminated. When the second embossed hologram is viewed a different optical effect arises than when the surfaces bearing the first embossed hologram are viewed. The optical structures, e.g. diffraction gratings of embossed holograms, have typical orders of magnitude and spacings of a few hundred nanometers and are thus not recognizable with the naked eye. Only when illuminated with corresponding reconstruction light and viewed at the holographic reconstruction angle does the holographically stored information become visible. Unlike e.g. two adhesive holograms that have been glued one above the other, the two embossed hologram structures present in one embossing layer can thus normally not be recognized by simple viewing with the naked eye. Only illumination with reconstruction light and viewing at the corresponding reconstruction angle make the double structure recognizable.

The inventive method can thus be used to produce an optical element that firstly causes a special optical, and possibly especially esthetic, effect. Additionally, the structure having a plurality of different embossed holograms in one embossing layer is more difficult to imitate. This results in a higher recognition value, which can also be checked easily without special equipment.

Embossing the second embossed hologram structure into the same embossing layer as the first embossed hologram structure permits simple production. It is not necessary to glue different layers onto each other or interconnect them.

Further embossing steps can of course be provided for further embossed holograms that partly replace the first and/or previously formed embossed holograms.

The second embossed hologram structure can have the same external form for all optical elements. However, a significant increase in forgery-proofness and/or range of application is given if the second embossed hologram is different for each optical element. In this way the optical element can be individualized as a security feature, e.g. in the form of a consecutive registration number.

In advantageous embodiments, the first and second embossed holograms have different reconstruction angles and/or different reconstruction wavelengths.

Additional information can be represented if the external form of the second embossed hologram can likewise convey information. The first embossed hologram is then replaced with the second embossed hologram in the form of the external form of the latter. Upon viewing of the optical element, the information stored in the first embossed hologram or the information stored in the second embossed hologram thus becomes visible depending on the viewing angle or viewing light. It additionally becomes recognizable what external form the second embossed hologram has. For example, the second embossed hologram can have the external form of a number. This number can e.g. correspond to the serial number of a document of value.

While the first embossed hologram can be formed in the embossing layer of the film in bulk, the second embossed hologram can be embossed individually for each single optical feature in the form of a different number. This permits the optical features to be individualized very well.

The inventive method can be carried out especially simply using a numbering embosser which advantageously comprises metallic positive or negative numbers produced by etching or engraving technology and each having a holographic relief applied thereto. If the numbers of the numbering embosser already bear the holographic relief for the second embossed hologram on the embossing surface, the numbering process for producing the second embossed hologram can be performed as in a customary numbering embossing process. While a first embossed hologram is being brought into the embossing position for the second embossed hologram, the numbering tool switches to the desired number. The second embossed hologram is embossed into the embossing layer of the first embossed hologram layer in the external form of the desired number. Subsequently, an adhesive layer is e.g. applied to the back and the optical feature glued to the object to be protected, e.g. a document of value. A further first embossed hologram is brought into the position for embossing the second embossed hologram while the numbering embosser advances one number. The process is now repeated accordingly.

The holographic relief on the embossing surface of the numbering tool can be e.g. a corresponding nickel master bearing the embossed structure of the second embossed hologram in metallic form.

In another advantageous embodiment, a nickel band having a holographic relief is placed over the number wheel of an embossed numbering unit. The embossing surfaces of the numbering unit then need not be provided with the holographic relief themselves. In the embossing process for the second embossed hologram the embossing surface of the particular number of the numbering embosser presses the nickel band having the holographic relief into the embossing layer of the first embossed hologram. In the external form of the particular number of the numbering embosser the holographic relief structure of the nickel band is thus embossed into the embossing layer of the first embossed hologram.

An inventive optical element that can be used in particular advantageously as a security feature for documents of value comprises a first embossed hologram in an embossing layer and a second embossed hologram in the same embossing layer. The second embossed hologram is disposed within the external outlines of the first embossed hologram.

In such an inventive method, an embossable film or substrate surface is printed partly with a curable printing lacquer. Subsequently said lacquer is cured. In a further method step an embossed hologram is embossed onto the thus partly printed substrate, the cured lacquer preventing embossing in the printed partial areas. Such an inventive method likewise permits the representation of information by the external form of the surface printed with the cured lacquer. The image that is reconstructed holographically when the embossed hologram is illuminated leaves out the printed partial areas. In this way the information represented e.g. in the external form of the printed areas is visible.

In a further inventive method, an embossable film or substrate surface having an embossed hologram is first provided. To said embossed hologram a printing lacquer is applied in partial areas to fill the embossed relief structure of the hologram. Optionally, the lacquer is subsequently cured. This inventive method thus also produces an optical element whose embossed hologram is left out in partial areas. Again, the partial areas can have an external form of information, e.g. a number. Upon illumination of the embossed hologram, the filled partial areas do not reconstruct the image stored in the hologram, so that the information stored by the external form becomes recognizable.

In the latter inventive method, it is thus possible in a simple way to represent additional information going beyond what is reconstructed holographically by the embossed hologram. Application of the printing lacquer is possible in a simple way and optionally individually for each single optical element. This guarantees high forgery-proofness.

In these inventive methods using printing lacquer, the external form of the printed partial areas can again correspond to an individual number, thereby permitting e.g. a consecutive registration of optical elements or the security features or documents of value provided therewith.

The printing lacquer can be applied to the embossing film in different ways. Application is especially simple and reliable using a jet printer, similar to an ink jet printer, which applies the lacquer in the desired external form. Application with a laser printer also permits simple and reliable design.

It is especially advantageous if the printing lacquer is transparent or colored-transparent. Such an embodiment increases the forgery-proofness of the finished optical element since the surface in the partial areas does not differ from the surrounding embossed hologram areas by a completely different color or transmission.

The optical element produced with an inventive method can be used and fastened in different ways, e.g. as a security element. It is especially simple and thus advantageous if an adhesive layer for fastening the optical element to the object to be protected is applied to the unembossed side only after all embossing processes have been performed. An adhesive layer attached only after all embossing processes have been performed does not hinder the embossing processes.

It is especially advantageous to use an adhesive coating in the form of a hot-melt adhesive coating which can be treated thermally.

In all inventive methods, a metalization or coating with a highly refractive material is advantageously performed at the end of the production process but at least only after all embossing processes, for protecting the structure or making the holographic effect well representable.

For the inventive method one can use embossable substrate surfaces, in particular and especially advantageously hot stamping foils, sticker embossing films, paper coated with thermal lacquer or substrate surfaces coated with UV lacquer.

An inventive optical element of another embodiment, which can likewise be used in particular advantageously as a security feature for documents of value, comprises an embossed hologram in an embossing layer, whereby at least one partial area of the relief embossed into the embossing layer is filled so that no holographic reconstruction can take place in the partial area.

In an inventive optical element of a further embodiment, which can likewise be used in particular advantageously as a security feature for documents of value, an embossed hologram is provided in an embossing layer, the relief being left out in the embossing layer at least in one partial area.

Hereinafter the invention will be explained in detail with reference to preferred embodiments and designs. The figures show examples of inventive embodiments in a schematic representation, whereby

BRIEF DESCRIPTION OF THE DRAWINGS

FIG. 1 shows an inventive document of value having an inventive optical feature, FIG. 2 shows an inventive optical element, FIG. 3 shows another embodiment of an inventive optical element.

DETAILED DESCRIPTION OF THE INVENTION

Figure 4:
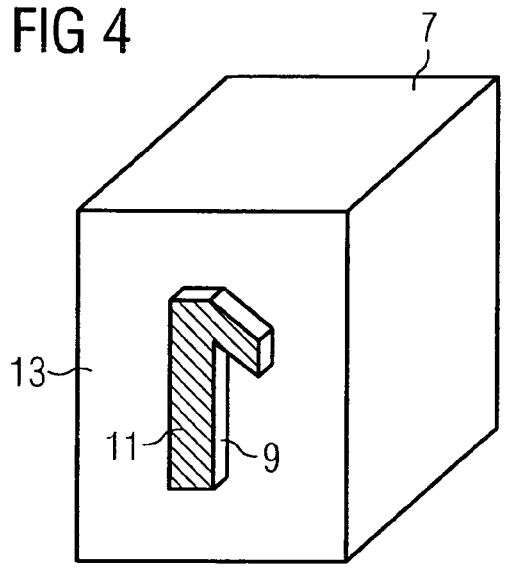
FIG. 4 shows an embossing die of an inventive numbering embosser.

FIG. 1 shows a schematic representation of e.g. bank note 1. Said bank note has applied thereto in known fashion information, e.g. the value and image information, which is of little interest here and accordingly not included in the figure. Bank note 1 optionally contains various security features, such as watermarks or guilloches, which are likewise omitted here.

Number 3 designates an inventive security feature on inventive bank note 1. Inventive security feature 3 includes, among other things, number 5, in the shown example the number "123."

FIG. 2 shows the inventive security feature of this embodiment in an enlarged representation. It comprises first embossed hologram 30, which is shown only schematically in the form of lines. Said first embossed hologram can be a diffraction grating. The spacing of the individual grating stripes is typically a few hundred nanometers to permit interference effects of visible light to be produced in known fashion. The invention is of course not limited to such stripe-shaped holograms, but can have any desired forms of embossed hologram representing different information holographically, e.g. the image of a three-dimensional object.

In the same layer of first embossed hologram 30 there is a second embossed hologram, whose embossed structure 50 is again shown only in an extremely schematic representation in the form of lines. A possible embodiment again comprises a diffraction grating similar to diffraction grating 30. However, the spacing of the individual grating stripes is different, so that a different wavelength interferes in this diffraction grating compared to the first embossed hologram. Second embossed hologram 50 reconstructs in a different direction, which is schematically indicated by the different direction of hatching in FIG. 2. It is of course also true of second embossed hologram 50 that any other holographic information can be stored, e.g. the three-dimensional holographic image of an object.

The external form of second embossed hologram 50 shows the number "123" in the shown example.

FIG. 3 shows an embodiment in which second embossed hologram 51, again indicated extremely schematically only as hatching, has gaps in the form of digits. In gaps 31 first embossed hologram 30 becomes visible. Thus, the digits of the number "123" shown by way of example are bordered by second embossed hologram 51.

FIG. 4 shows the embossing die of an inventive embodiment of a numbering embosser. Embossing die 7 is shown for structure 9, the digit "1" here. On embossing side 13 the digit "1" is formed in raised fashion in a laterally reversed representation. On the embossing surface of the raised digit, embossing structure 11 for an embossed hologram is applied as a nickel master. Here, too, the representation is of course indicated extremely schematically only as hatching.

Inventive optical elements can be produced by an inventive method as follows.

First, first embossed hologram 30 is formed in conventional fashion in an embossable film, which either is formed completely as an embossing layer or comprises an embossing layer. For example, the embossing layer can be a thermal lacquer layer in which a hologram is hot stamped in known fashion. For this purpose the desired embossed hologram structure is embossed using a hot stamping die. This process can be effected in mass production. For example, the first embossed hologram structure can be embossed on a larger film unit and cut later.

The thus produced film having first embossed hologram 30 in the embossing layer is supplied to a numbering tool suitable for embossing consecutive numbers. This embossing tool is used to emboss a number into the same embossing layer where first embossed hologram 30 is located and thus replaces the embossed structure of the first embossed hologram in the external form of the embossing surface of the embossing die of the numbering tool. Second embossed hologram 50, 51 is thus embossed into first embossed hologram structure 30 in the external form of the numbers of the numbering tool.

Various forms for the numbers are conceivable. For example, the numbers of the second embossed hologram structure can represent a number positively, as shown in FIG. 2, or appear as a border in negative form, as e.g. in FIG. 3.

FIG. 4 shows e.g. embossing die 7 for a positive digit "1." The second embossed hologram structure is located e.g. as a nickel master on embossing surface 11 of an embossing die of the numbering tool. In an alternative embodiment, a nickel band bearing the structure for embossing the second embossed hologram is placed around the number wheel of the numbering embosser. During embossing, the structure of the nickel band is molded into the embossing layer of the first embossed hologram using the numbering tool, without the embossing surfaces of the numbering wheel having to be structured themselves.

Figure 5:
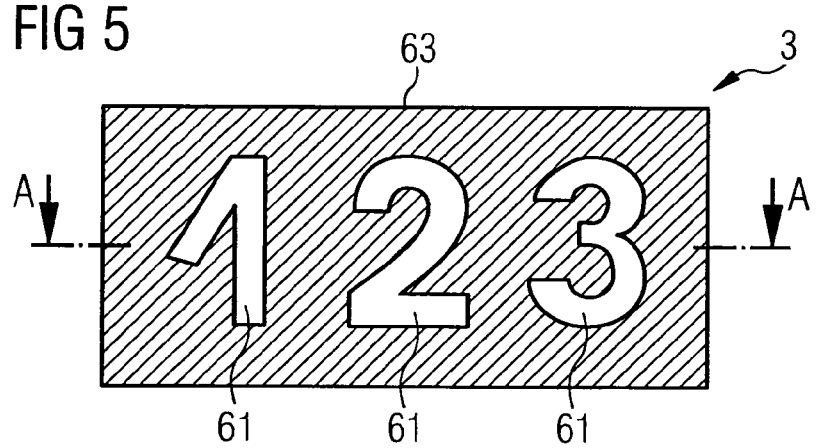
FIG. 5 shows the plan view of an inventive optical element according to a further embodiment.

FIG. 5 shows further inventive security feature 3 which can be provided on bank note 1. As shown in FIG. 1, the security feature according to this embodiment again comprises number 5, in the shown example the number "123."

The inventive security feature of this embodiment comprises embossed hologram 63, which is again shown only schematically in the form of lines. Said embossed hologram can also be a diffraction grating whose grating spacing is typically a few hundred nanometers to permit interference effects of visible light to be produced in known fashion. The embossed hologram is of course not limited to such stripe-shaped holograms here either but can have any desired forms of embossed hologram that represent different information holographically, e.g. the image of a three-dimensional object.

Within the outlines of embossed hologram 63 there are areas 61 that do not bear any embossed structure like surrounding embossed hologram 63. This can be obtained by different proceduress, which are described below.

In areas 61 there is no holographic reconstruction upon illumination, so that the holographic effect is left out in said areas. Total security feature 3 thus shows a holographic effect, e.g. the representation of a three-dimensional object. Only partial areas 61 in the external form of the number "123" fail to reconstruct an image holographically, so that they are recognizable and the information of their external form is visible.

Such an inventive optical feature can be produced as follows. Embossed hologram 63 is formed in conventional fashion in an embossable film, which either is formed completely as an embossing film or comprises an embossing layer. The embossing layer can e.g. be a thermal lacquer layer in which a hologram is hot stamped in known fashion. For this purpose the desired embossed hologram structure is embossed using a hot stamping die in this embodiment as well. This process can be effected in mass production, e.g. embossed on a larger film unit and cut later.

Figure 6:
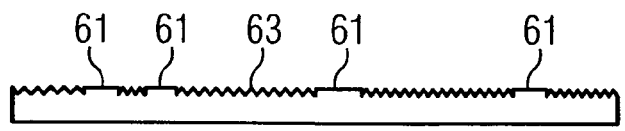
FIG. 6 shows a cross section along line A—A in FIG. 5.

A laser printer or jet printer, similar to an ink jet printer, is used to apply printing lacquer 61 to embossed hologram structure 63 in the desired external form, here the number "123," thereby filling the relief of the embossed hologram structure. This is visible in cross section in FIG. 6. In the areas filled with lacquer 61, embossed hologram layer 63 no longer reconstructs holographically when illuminated with reconstruction light.

In another inventive method, printing lacquer 61 is applied to an embossable film in a desired external form, e.g. in the shape of the number "123," with a laser printer or jet printer, similar to an ink jet printer, before the embossed hologram is embossed. After a curing step for the printing lacquer, the film thus provided partly with printing lacquer is embossed in the way known for embossed holograms, thereby producing embossed hologram 63. In the areas printed with lacquer 61, embossing is prevented during the embossing step so that here, too, there can be no holographic reconstruction in the completed optical element.

In all described embodiments, a hot-melt adhesive layer for fastening the optical element to document of value 1 is applied to the back of optical element 3 only after all necessary embossing processes have been performed. Since said adhesive layer is applied only after all embossing processes, it cannot disturb the prior method steps.

In all inventive embodiments, the embossable substrate surface used can be a hot stamping foil, sticker embossing film, paper coated with thermal lacquer or substrate surface coated with UV lacquer. The invention is not limited to single number 5. The method and optical features are especially advantageous when the external form of holographic area 50, 31 reconstructing differently or area 61 not reconstructing holographically at all is a consecutive number that is allotted individually to each optical element. This makes it possible to individualize the particular optical element, e.g. in the manner of a registration number for a document of value.

The invention claimed is:

1. A method for producing an optical element, having the following steps:
   a$^1$) providing an embossable film or substrate surface having a first embossed hologram in an embossing layer, and
   b$^1$) embossing at least a second embossed hologram into the same embossing layer such that the first embossed hologram is partly replaced with the second embossed hologram.

2. A method according to claim 1, wherein the optical element is individualized with step b$^1$).

3. A method according to claim 2, wherein step b$^1$) is performed with an individualized embossing die.

4. A method according to claim 1, wherein the first embossed hologram and the second embossed hologram have at least one of different reconstruction angles or different reconstruction wavelengths.

5. A method according to claim 1, wherein step b$^1$) is performed using an embossing tool having at least one embossing surface in the form of the desired external form of the second embossed hologram.

6. A method according to claim 5, wherein step b$^1$) comprises the embossing of a second embossed hologram with the external form of an individual number.

7. A method according to claim 6, wherein step b$^1$) comprises the use of a numbering embosser whose embossing dies comprise positive or negative numbers to which a holographic relief is applied.

8. A method according to claim 7, wherein the positive or negative numbers comprise metallic numbers produced by etching or engraving technology.

9. A method according to claim 7, wherein a nickel master is used as a holographic relief.

10. A method according to claim 6, wherein for performing step b$^1$) a nickel band having a holographic relief is placed over the numbers of a number wheel of an embossed numbering unit.

11. A method according to claim 1, having the following additional step:
    c) metalizing or coating with a highly refractive material on the embossed side of the optical element.

12. A method according to claim 1, wherein after step b$^1$), an adhesive coating is applied to the unembossed side of the film.

13. A method according to claim 1, wherein in step a$^1$) embossable substrate surfaces, selected from the group consisting of hot stamping foils, sticker embossing films, paper coated with thermal lacquer and substrate surfaces coated with UV lacquer, are used.

14. A numbering embosser for use in a method according to claim 1 whose embossing surfaces are each provided with a holographic relief, the external form of the embossing surfaces corresponding either positively or negatively to the external form of the number to be embossed.

15. An optical element that is produced by a method according to claim 1, having a first embossed hologram in an embossing layer and a second embossed hologram in the same embossing layer, the second embossed hologram being disposed within the external outlines of the first embossed hologram.

16. An optical element according to claim 15, wherein the first embossed hologram and the second embossed hologram have at least one of different reconstruction angles or different reconstruction wavelengths.

17. An optical element according to claim 15, wherein the second embossed hologram comprises an individual external form, in particular the form of a number either in positive or in negative representation.

18. An optical element according to claim 15, wherein the film is provided with an adhesive layer on the unembossed side.

19. A document of value having an optical element according to claim 15.

20. A document of value having an optical feature produced by a method according to claim 1.

* * * * *